Jan. 14, 1958 D. L. BLACHLY 2,819,742
KERF GUIDE AND SPLITTER
Filed July 5, 1955

Inventor
Donald L. Blachly

United States Patent Office 2,819,742
Patented Jan. 14, 1958

2,819,742

KERF GUIDE AND SPLITTER

Donald L. Blachly, Milwaukee, Wis., assignor to John Oster Manufacturing Company, Milwaukee, Wis., a corporation of Wisconsin Application July 5, 1955, Serial No. 519,753

2 Claims. (Cl. 143—43)

This invention relates to portable electric saws of the type wherein a circular saw blade is driven by an electric motor, and the saw blade and motor are mounted as a unit upon a base or shoe by which the entire saw may be slid or moved across the surface of a workpiece.

In the operation of portable saws of this type, it is not uncommon for the saw to have a tendency to wander from the straight line along which the cut is to be made. This tendency exists even when the saw is equipped with a rip fence, especially where the rip fence is so located that it engages the edge of the work forwardly of the cut being made by the saw.

This invention has as its purpose to provide means by which the tendency for the saw to wander off its intended path is overcome, and achieves this purpose through the provision of a novel guide, referred to hereinafter as a kerf guide since it follows along behind the saw blade in the kerf cut thereby. Experience has demonstrated that this guide eliminates the tendency of the saw to wander from its prescribed path and coacts with the rip fence in assuring straight line advance of the saw.

It has also been found that the guide has the additional very important advantage of keeping the kerf open behind the saw blade and thereby preventing warped lumber from pinching the blade.

Portable electric saws of the type to which this invention pertains generally provide for tilting adjustment for the saw with respect to its supporting base or shoe, and since it is important that the kerf guide be coplanar with the saw blade at all times, it is another object of this invention to so mount the kerf guide that no matter how the saw is adjusted the coplanar relationship between the saw blade and kerf guide is always retained.

With the above and other objects in view, which will appear as the description proceeds, this invention resides in the novel method and construction, combination and arrangement of parts substantially as hereinafter described and more particularly defined by the appended claims, it being understood that such changes in the precise embodiment of the herein disclosed invention may be made as come within the scope of the claims.

Figure 1:
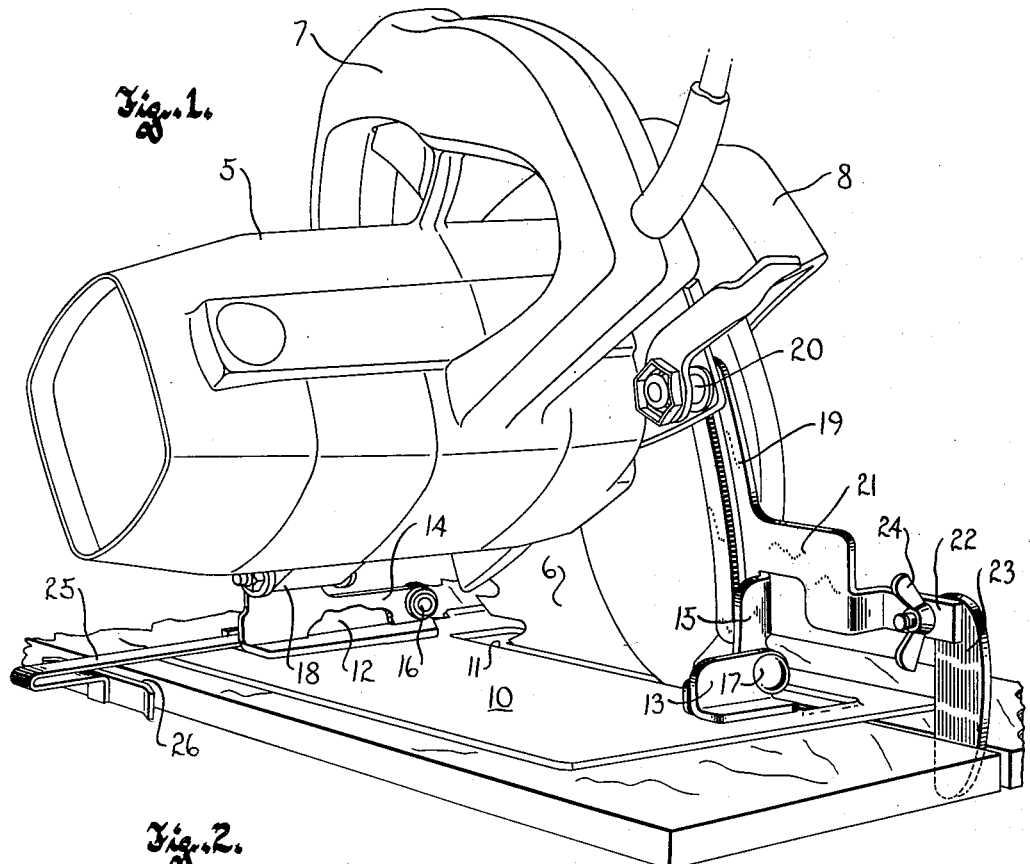
Figure 2:
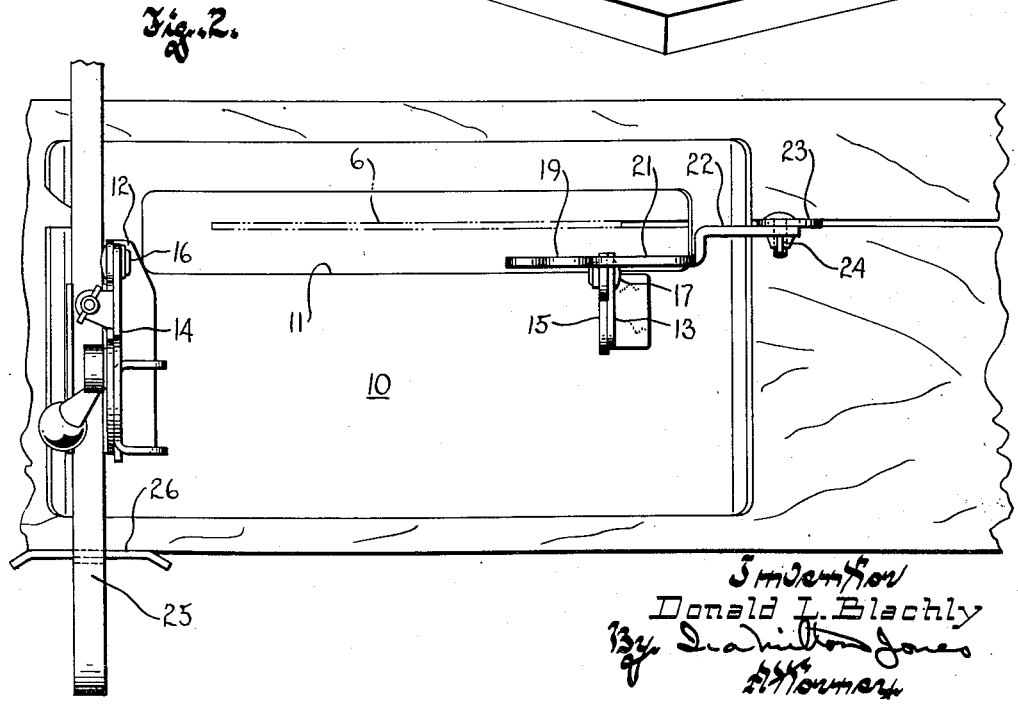

The accompanying drawing illustrates one complete example of the physical embodiments of the invention constructed according to the best mode so far devised for the practical application of the principles thereof, and in which:

Figure 1 is a perspective view of a portable electric saw equipped with this invention; and Figure 2 is a top plan view of the base or shoe of the saw, with the motor and saw blade removed to more clearly illustrate the function of the kerf guide and its coaction with the rip fence.

Referring to the accompanying drawing the numeral 5 designates the driving motor of a portable electric saw and by which a circular saw blade 6 is driven. The housing for the motor has a handle 7 formed integrally therewith, and a suitable guard structure 8 is mounted on the motor to cover the saw blade as is customary in tools of this type. The motor and saw blade are mounted as a unit upon a base or shoe 10. This shoe is preferably a flat plate of a size to provide a stable footing or support for the saw, and has a slot 11 along one edge thereof through which the saw blade projects.

The mounting of the motor-saw blade unit upon the shoe 10 comprises spaced upright flanges 12 and 13 fixed to the top of the shoe, the former near the front end or toe of the shoe, and the latter near the heel of the shoe. These flanges have brackets 14 and 15 pivotally connected thereto as at 16 and 17 respectively. The pivots 16 and 17 are in axial alignment and parallel to the saw slot 11.

The bracket 14 has the motor housing 5 pivoted thereto as at 18, and the bracket 15 has an arcuate upwardly projecting slotted arm 19 to which the adjacent portion of the guard structure is adjustably clamped as at 20. The pivot 18 and the slotted arm 19 thus coact to permit the saw and motor to be raised and lowered with respect to the shoe 10, to thereby provide a depth adjustment for the saw, and the pivots 16 and 17 provide for tilting adjustment of the saw.

The slotted arm 19 has a rearwardly projecting extension 21 with an offset trailing end portion 22 projecting beyond the heel of the shoe. Clamped to this trailing end portion 22 is the kerf guide 23. This guide is essentially a flat rigid blade of a thickness substantially equal to the width of the kerf cut by the saw, and as best shown in Figure 2, the offset trailing end portion 22 to which the kerf guide is fixed is so located that it holds the kerf guide in coplanar alignment with the saw blade. Thus, when the kerf guide is in its operative position shown in Figure 1, its lower end projects down below the bottom of the shoe to enter and follow along the kerf cut by the saw blade. To permit the kerf guide to be loosened and swung out of the way, its securement includes a wing nut 24.

Secured to the forward portion of the base or shoe is a rip fence 25, the guide surface 26 of which is adapted to have sliding engagement with the edge of the workpiece. The specific manner of securing the rip fence to the shoe has not been shown, but includes means enabling adjustment of the guide surface 26 toward and from the side of the shoe as is customary in tools of this character. The guide surface 26 of the rip fence is relatively short and engages the workpiece forwardly of the point at which the saw acts upon the work. Accordingly, the rip fence and the kerf guide together provide guiding engagement with the workpiece ahead of and behind the point at which the saw cuts the work, and thus coact to more accurately guide the path of the saw 6 and eliminate any tendency for the saw to wander from its prescribed path.

From the foregoing description taken in connection with the accompanying drawing, it will be readily apparent to those skilled in the art that this invention provides a substantial improvement in portable electric saws, since it not only eliminates the tendency for the saw to wander, but in addition holds the kerf open and prevents warped lumber from pinching the saw blade.

What I claim as my invention is:

1. In a portable electric saw of the type wherein a rotatable circular saw blade is driven by an electric motor and a shoe supports the motor housing for translation of the saw across the surface of a workpiece: means pivotally mounting the motor and the saw blade as a unit upon the shoe in a manner providing for tilting of the motor and blade with respect to the shoe about an axis parallel and adjacent to the plane of the blade, said means including a bracket comprising an upright arm, means rigidly connecting the upper end portion of the arm to the motor housing, and means connecting the lower portion of the arm to the rear portion of the shoe to provide for swinging of the arm on said axis and consequently tilting of the motor and saw blade with the arm during such swinging motion thereof; means fixed with respect to the bracket providing a rearwardly projecting extension of said arm having a trailing end portion which projects beyond the rear of the shoe and is offset from the arm toward the plane of the saw blade; a kerf guide and splitter in the form of a flat blade having a thickness substantially equal to the width of the kerf cut by the saw blade; and means mounting the kerf guide upon the offset trailing end portion of said extension on the arm with the kerf guide in coplanar alignment with the saw blade and projecting below the bottom of the shoe to enter and move along the kerf cut by the saw, the mounting of the kerf guide upon said bracket assuring the maintenance of coplanar relationship between the kerf guide and saw blade despite tilting adjustment of the saw blade and motor with respect to the shoe.

2. The portable electric saw set forth in claim 1 wherein said means which mounts the kerf guide and splitter upon the offset trailing end portion of the arm extension also provides for swinging motion of the kerf guide and splitter about an axis parallel to the axis of rotation of the saw blade from an operative position projecting below the bottom of the shoe to an inoperative raised position at which the kerf guide and splitter clears the kerf cut by the saw.

References Cited in the file of this patent
UNITED STATES PATENTS

| | | |
|---|---|---|
| 1,102,018 | Dodds | June 30, 1914 |
| 1,803,068 | McKeage | Apr. 28, 1931 |
| 1,806,528 | Fegley et al. | May 19, 1931 |
| 1,821,113 | Neighbour | Sept. 1, 1931 |
| 1,885,087 | DeWitt | Oct. 25, 1932 |
| 2,377,673 | Chaddock | June 5, 1945 |
| 2,671,476 | Richards et al. | Mar. 9, 1954 |